United States Patent [19]

Scheinert

[11] Patent Number: 5,787,344

[45] Date of Patent: Jul. 28, 1998

[54] ARRANGEMENTS OF BASE TRANSCEIVER STATIONS OF AN AREA-COVERING NETWORK

[76] Inventor: Stefan Scheinert, Gartenstrasse 9, DE-90443 Nürnberg, Germany

[21] Appl. No.: 493,793

[22] Filed: Jun. 22, 1995

[51] Int. Cl.$^6$ ........................................ H04Q 7/20
[52] U.S. Cl. ...................... 455/422; 455/446; 455/447; 455/449
[58] Field of Search ................... 455/33.1, 33.4, 455/34.1, 54.1, 56.1, 63, 33.2, 422, 443, 444, 449, 450, 446, 436, 517, 524, 464, 447, 11.1, 20, 561, 562; 379/59, 60

[56] References Cited

U.S. PATENT DOCUMENTS

| | | |
|---|---|---|
| 4,144,411 | 3/1979 | Frenkiel . |
| 4,696,052 | 9/1987 | Breeden ............................. 455/503 |
| 4,783,843 | 11/1988 | Leff et al. .......................... 455/20 |
| 4,941,200 | 7/1990 | Leslie et al. ....................... 455/20 |
| 5,065,449 | 11/1991 | Gordon et al. ..................... 455/15 |
| 5,233,643 | 8/1993 | Naeini et al. ...................... 455/33.4 |
| 5,257,398 | 10/1993 | Schaeffer .......................... 379/63 |
| 5,396,645 | 3/1995 | Huff ................................... 455/34.1 |
| 5,426,690 | 6/1995 | Hikuma et al. . |
| 5,428,818 | 6/1995 | Meidan et al. ..................... 455/34.1 |
| 5,450,473 | 9/1995 | Shiotsuki et al. . |
| 5,475,866 | 12/1995 | Ruthenberg ....................... 455/34.1 |
| 5,483,666 | 1/1996 | Yamada et al. ................... 455/34.1 |
| 5,487,174 | 1/1996 | Persson ............................. 455/33.2 |
| 5,548,806 | 8/1996 | Yamaguchi et al. . |
| 5,588,043 | 12/1996 | Tiedemann, Jr. et al. ......... 379/63 |

FOREIGN PATENT DOCUMENTS

| | | |
|---|---|---|
| 0536864A2 | 4/1993 | European Pat. Off. . |
| 000568142 | 11/1993 | European Pat. Off. ........... 455/91 |
| 2659570C2 | 7/1978 | Germany . |
| 2806178C3 | 8/1978 | Germany . |
| 3211979A1 | 3/1982 | Germany . |
| 3528974A1 | 8/1985 | Germany . |
| 4141398C2 | 12/1991 | Germany . |
| 0177223 | 7/1989 | Japan ................................ 455/33.2 |

*Primary Examiner*—Jacques H. Louis-Jacques
*Assistant Examiner*—Gertrude Arthur
*Attorney, Agent, or Firm*—Frank H. Foster; Kremblas, Foster, Millard & Pollick

[57] ABSTRACT

An arrangement of an area covering, cellular radio communication network having cell regions which can be, contiguously replicated without interference. A central transceiver station is coupled to a base station controller and has a plurality of decentral transceiver stations surrounding and coupled to the central transceiver station. Groups of adjacent decentral transceiver stations are grouped in respective cell areas. All of the decentral transceiver stations in each cell area are allocated the same transmission frequencies, but the frequencies of each cell area are different from the other cell areas in the cell region.

21 Claims, 6 Drawing Sheets

ARRANGEMENTS OF BASE TRANSCEIVER STATIONS OF AN AREA-COVERING NETWORK

FIELD OF THE INVENTION

The invention relates to a plurality of arrangements of base transceiver stations of an area-covering radio network and to a method of operating such an arrangement.

The invention further comprises base transceiver stations adapted to the new arrangements and a method of subsequently compressing an existing continuous radio network.

DESCRIPTION OF RELATED ART

In order to operate radio telephones, in addition to the respective mobile stations, an area-covering network of fixed transmission stations is necessary in order to ensure interference-free radio operation at any location within the area of coverage.

In order to permit a large number of mutually independent radio participants to use their telephones simultaneously, the region of coverage is divided into a plurality of individual cells, each allocated with its own base transceiver station. By giving adjacent zones different frequencies, it is possible to identify a particular radio telephone with a respective base transceiver station. If the radio telephone is set to a special frequency of the current cells, radio communication is oriented to precisely one fixed transmission station, from which the conversation is forwarded to a base station controller. By the possibility of allocating one and the same transmission frequency to a plurality of zones which are relatively remote from one another, a very large number of conversations can be transmitted simultaneously, using a limited number of transmission frequencies.

If one ignores interference caused by topographical irregularities etc., a radio network can be put together from a plurality of base transceiver stations arranged in a specified structure, their mutual distance being determined by the range afforded by the transmission power. On the other hand, the spatial sequence of different transmission frequencies is on the one hand such that adjacent, base transceiver stations are allocated different frequencies and furthermore a minimum distance is retained in base transceiver stations using the same transmission frequencies in order to eliminate reliably any interference.

From these peripheral conditions, certain structures arise which can be linked together in lines to form a continuous grid. In establishing the basic structure of such a radio network, the following parameters need to be optimised:

On the one hand, the number of cells should be as large as possible without increasing the number of base transceiver stations. With the large number of cells, a large number of conversations can be transmitted simultaneously. On the other hand, any conventional base transceiver station requires a high level of investment, which considerably increases the cost of the radio network. It has been proposed in the prior art to provide at each base transceiver station, instead of one non-directional aerial, three directional aerials, each covering a transmission or reception angle of approximately 1200, so that the number of cells can be tripled, but such a modus operandi involves heavily increased aerial and installation costs.

Furthermore, the participant capacity to be handled can be increased if the number of channels per cell is increased. The more channels there are available in one cell, the more participants can telephone simultaneously from this cell. On the other hand, however, the total number of frequencies should not be increased, since the transmission frequencies available are limited by a number of other data transmission systems. In order to achieve a large number of channels per cell, the frequencies must be capable of being repeated at the minimum possible distance from one another. In order to meet this requirement, according to the prior art a hexagonal grid is used, in which the base transceiver stations are arranged in parallel columns, the transceiver stations of adjacent columns being staggered relative to one another by half a distance in the direction of the column. This gives the associated cells a hexagonal shape, a large number of which are joined together like honeycomb cells in order to form a continuous network. In many applications, these basic areas are further subdivided by the above-mentioned allocation of sectors to different aerials. With the hexagonal structure, an elementary system composed of seven base transceiver stations is put together, each station requiring a different transmission frequency, since each cell abuts six further cells.

Where such grid structures known from the prior art are used for the base transceiver stations of an area-covering radio network, the two above-mentioned optimisation criteria, in particular the product of the radio cell area and the number of fixed stations (which are cost-intensive due to being coupled to a base station controller) and the ratio of the number of channels per cell to the total number of transmission frequencies, cannot be varied. Although the area per cell per area can be reduced by reducing the transmission power, which means simultaneously increasing the number of fixed stations, because on the other hand the minimum number of cells is specified by different transmission frequencies (e.g. seven structure), the number of channels per cell can only be increased by increasing the number of frequencies as a whole.

SUMMARY OF THE INVENTION

The problem of the invention arises from these disadvantages of known arrangements of base transceiver stations of an areacovering radio network, and consists in changing the basic structure of the network in such a manner that, without increasing the number of cost-intensive base transceiver stations coupled to a base station controller, the number of cells per area is increased and/or without increasing the total number of frequencies of the network, the number of channels per cell can be increased.

To this end, the invention provides, in a first arrangement of base transceiver stations of an area-covering radio network which are coupled at least in part to base station controllers, that each base transceiver station coupled to a base station controller is surrounded by a plurality of further, decentral transceiver stations which are coupled to the central transceiver station and form one or more cell areas each having a different transmission frequency. The advantage of this arrangement is that the area of coverage of a base transceiver station coupled to a base station controller is increased by the decentral transceiver stations without increasing the transmission power of the central transceiver station coupled to a base station controller. Since cell areas having different transmission frequencies are coupled to the decentral transceiver station, the number of cells per unit area can be increased without having to raise the number of fixed stations coupled to a base station controller. Since the decentral transceiver stations are not coupled to a base station controller but to a central transceiver station, they can be manufactured very simply and cheaply, as will be explained more fully below. By a favourable arrangement of the base stations and the decentral transceiver stations, the number of frequencies required for the basic coverage (1 channel per cell) is reduced (e.g. 2×1+4×1), so that within an elementary base cell (of approx. 9 times' the area of a single base transceiver station) it is even possible to use all frequencies. Thus the number of channels per unit area can be increased.

It has proved advantageous if the decentral cell area(s) as a whole completely surround the central cell (s). This ensures on the one hand an arrangement with an optimum coverage area, which may be approximately four to ten times as large as the original or central cell area. Thus the number of base stations coupled to a base station controller is reduced by a corresponding factor. On the other hand, the central cell area is completely surrounded by the decentral cell areas, so that the transmission frequencies of the central cell(s) can already be used in the adjacent transceiver station coupled to a base station controller.

It has proved advantageous if the decentral cell areas have an approximately annular or annular sector-shaped configuration defined by approximately arc-shaped and/or polygonal border lines. The outer cell areas together form a ring surrounding the central cell (s), so that the inner border line of the decentral cell areas ideally has the form of an arc. On the other side, in a cell region according to the invention, adjoining the total of the central and decentral cell areas of a central transceiver station coupled to a base station controller is a plurality of identical cell regions which duplicate the elementary cell region in the form of a square or honeycomb-type grid so as to form a continuous network. The external outlines of the cell areas are therefore formed from approximately straight lines. Within the scope of the invention, both a plurality of annular cell areas can be grouped around the decentral cell(s) and/or due to the different frequency allocations of individual decentral transceiver stations, annular-sector-shaped cell areas can be created within a ring.

It is within the scope of the invention that the transmission power of the channel units for the area coverage of the decentral base transceiver stations is lower than the transmission power(s) of the channel units for the area coverage of the central cell(s). Thus the dimensions of the decentral transmission stations can be reduced. The current requirement is low and can if necessary be covered by a rechargeable battery. This gives rise to low manufacturing and investment costs and fewer problems in the grant of permission.

A practical further development of the invention involves combining a large number of adjacent, decentral transceiver stations into one cell area with identical frequencies. Provided that, for example, a square grid is selected with identical cell regions, the decentral cell areas have a severely distorted shape (corners of a square) so that it is more favourable to cover these areas by means of a plurality of decentral transceiver stations. In order not to increase the number of necessary transmission frequencies, however, it is recommended to allocate to adjacent decentral transceiver stations the same frequencies and to join these transceiver stations together to form a common cell area. Any running time differences can be compensated.

It is within the scope of the invention to juxtapose a large number of cell regions each formed from a respective central and a plurality of decentral transceiver stations in order to form an area-covering network with an approximately grid-type and/or hexagonal structure. By means of such square and/or honeycombtype grid structures, the terrain can be covered without leaving gaps.

In an advantageous embodiment the transceiver stations within each of the juxtaposed cell regions have relative positions which approximately correspond geometrically. These correspondences are ascribable to the identical base structure of each individual cell region allocated to each transceiver station coupled to a base transceiver station controller. In practice, the relative positions will, albeit slightly, fluctuate within certain limits, on the one hand due to variations in the terrain resulting in different ranges for the transceiver stations, and on the other hand due to the local conditions to be taken into account when choosing a site for a decentral transceiver station demand a degree of flexibility in planning.

It is within the scope of the invention that the frequencies of the aerials for area coverage to transceiver stations of different cell areas corresponding to one another due to their roughly geometrically corresponding relative positions, are identical. Since both the geometric base structure of a cell region and the transmission frequencies of the individual cell areas are repeated, not only the number of base transceiver stations coupled to a base station controller but also the total number of transmission frequencies can be limited to a minimum.

It has proved advantageous that the decentral part of a cell region is divided into a plurality of, preferably four, cell areas with different transmission frequencies, each cell area being allocated an approximately constant central angle with respect to the central transceiver station. In order to permit direct duplication of the frequency of an elementary cell area, at least the outer ring of the cell region needs to be divided into a plurality of roughly annular-sector-shaped cell areas; so that when such cell areas are juxtaposed, it never arises that two cell areas with identical transmission frequencies abut one another. To this end, it is recommended in the case of a square grid to divide the outer ring into four cell areas, each with a central angle of approximately 90°, whereas in a honeycomb-type grid structure it is practical to divide the outer ring into six cell areas of different transmission frequencies, each cell area covering a central angle of approximately 60° with respect to the central transceiver station coupled to a base station controller.

The invention further provides that the coupling of the decentral transceiver stations to the respective central transceiver station comprises a wireless point-to-point connection. Thus the laying of cables is superfluous and the installation of a decentral transceiver station can be carried out without great cost and the initial outlay is thereby substantially reduced. The term point-to-point connection is understood to include not only radio link connections proper, but also connections in which the aerial of the central transceiver station has only a low directional characteristic, if any, in order to address, for example, a plurality of aerials of decentral transceiver stations of a cell area simultaneously.

Further advantages can be obtained if, for each point-to-point connection to a decentral transceiver station, the central transceiver station has its own, directional aerial and/or an optical transmitter-receiver device. In this case, each decentral transceiver station is coupled by means of its own radio link or laser relay section to the central transceiver station.

In addition, an embodiment is conceivable in which a common aerial for point-to-point connection to a plurality of decentral transceiver stations is available at the central transceiver station. This reduces the initial investment.

Furthermore, it is possible that the common aerial for connecting a plurality of decentral transceiver stations is identical to the aerial for the area coverage of the central cell. The combined use of the area coverage aerial of the central cell(s) is the arrangement involving the least extra cost.

It has proved advantageous if the frequencies of the point-to-point connections differ from the frequencies of the area coverage of the central cell(s). This prevents faults arising from interference with the signal for the area coverage of the central cell(s).

It has proved practical if the transmission power of the point-to-point connections is lower than the transmission power for the area coverage of the central cell (s). If directional aerials are used, together with high-quality receivers on the two transceiver stations communicating with one another, the transmission power can be reduced in order to eliminate faults due to trapping. On the other hand, a reduction in the transmission power in the case of transmission for example via the aerial for the area coverage of the central cell(s) can be used to make available to a mobile station, due to the different reception field strengths, a datum which can be referred to in selecting the signal for the area coverage.

The invention can be developed further if the frequencies of the point-to-point connections lie in a radio link frequency band or in an optical frequency band. The choice of such transmission frequencies is offered for technical reasons.

In addition, it is possible that the frequencies of the point-to-point connections lie in the network operator frequency range. It is thus possible to save on possible additional fees for extra radio link frequencies.

If frequencies of the network operator frequency range are used, the frequencies o the point-to-point connections my differ from the frequencies for the area coverage to the respective decentral cell. Thus acoustic feedback can be almost completely eliminated, ensuring fault-free operation.

However, a type of coupling is conceivable in which the frequencies of the point-to-point connections correspond to the frequencies for the area coverage of the respective, decentral cell. However, in this case it should be ensured that the directional aerial of the decentral transceiver station for coupling to the central transceiver station is spatially distant from all the aerials of the same decentral transceiver station providing the area coverage and/or is decoupled by further means in order to avoid interference from acoustic feedback.

Often, it is not necessary to draw up a new radio network, but to compress an already existing radio network in such a manner that, due to the high number of transceiver stations, not only outdoor operation of a mobile telephone, but also indoor operation is possible. Here the problem arises of finding a suitable structure in which if possible all the sites of existing base transceiver stations can be reused, and investment in additional installations at new sites will be kept as low as possible. In order to solve this problem, the invention proposes a method of retrospectively condensing an existing continuous radio network comprising base transceiver stations, which are coupled to base station controllers, wherein each existing transceiver station is surrounded by a plurality of decentral transceiver stations which are coupled to the central transceiver station and form one or more cell areas surrounding the decentral cell(s) in the outer space thereof, each cell area having a different transmission frequency. Thus, without the cost associated with the installation of conventional base transceiver stations coupled to a base station controller, in the critical outer space of each central cell, a reception field strength sufficient for indoor use can be achieved. In this manner, it is easily possible to upgrade an already existing continuous radio network by inserting decentral transceiver stations to one of the arrangements according to the invention described above for an area-covering radio network.

The arrangement of base transceiver stations of an area-covering radio network according to the invention requires special base transceiver stations both for the central and for the decentral transceiver stations. The central transceiver stations coupled to a base station controller are distinguished by the fact that, in addition to the channel units for the area coverage, further channel units are available for the bidirectional data transfer to at least one further base transceiver station. According to the invention, the signals for the area coverage of the decentral cell areas are generated or processed in the central transceiver station, so that all the decentral transceiver stations need to do is carry out amplification of the signals, in every case combined with a frequency conversion. Therefore, for every channel of the outer cell areas of the cell region, the respective central transceiver station has its own channel unit. In this case each channel unit consists preferably of a monitoring component, two transmitting and receiving units oriented in anti-parallel, and a filter assembly.

It is within the scope of the invention that the additional channel units are connected to additional direction aerials and/or to optical transmitter-receiver devices. In this embodiment, the coupling of a decentral transceiver station takes the form of a true, directional point-to-point connection.

In addition it is possible that the additional channel units are connected to the aerial(s) for the area supply. If different frequencies are used, the signals to be transmitted to the decentral transceiver stations can also be transmitted or received via the area coverage aerial(s) if the additional channel units are connected to that aerial.

It has been found advantageous if the transmission power of the transmitters of the additional channel units is lower than the transmission amplitude of the transmitter for the area coverage. This makes possible optimum separation due to the reduced reception field strength, even if a frequency of the network operator frequency band is used to couple the decentral transceiver stations, so that the mobile station can distinguish the signal for the area coverage clearly from the coupling signal for a decentral transceiver station.

In an advantageous further embodiment of the invention, for one or more of the additional direction aerials and/or optical transmitter-receivers, a respective time function element is provided, which is started by the additional transmitter and after the elapse of its time constant actuates the additional receiver. Due to the spatial distance of the decentral base transceiver stations from the central transceiver station, a constant running time corresponding to the distance between the central and decentral transceiver station is added to the variable running time, dependent on the site of the mobile station, of a signal between the decentral transceiver station and the mobile station. If a monitoring signal is consequently sent from the central transceiver station via a decentral transceiver station to the mobile station, a reply signal can reach the central transceiver station at the earliest with a time-lag corresponding to twice the value of the constant running time between the base transceiver stations. This constant timelag can be taken into account by a time function element whose time constant is approximately twice the value of the constant running time between the central and decentral transceiver station. If a plurality of decentral transceiver stations is coupled via a signal aerial of the central transceiver station, it is possible to use as a time constant of the time function element a minimum or average value of the different, but in each case constant, running times of the individual decentral transceiver stations.

The invention is further characterised by one or more selection circuits in order to select, as a function of the reception field strength of a signal transmitted by a plurality of the coupled base transceiver stations, the associated coupling aerial(s). If the cells of a plurality of decentral transceiver stations are combined into one cell area with common frequencies, the radio signal of a mobile station will be received most strongly by the decentral transceiver station in whose cell the mobile station is located at that instant. Furthermore, however, a weakened signal is received by the other transceiver stations of this cell area and is transmitted to the central transceiver station. This selects, by means of a selection switching circuit the transceiver station of this cell area whose reception field is the strongest and then transmits the signal directed at the mobile station solely to the selected decentral transceiver station. Thus running time differences between radio signals originating from different decentral transceiver stations can be eliminated and the transmission quality thereby improved. The same method can also be applied to the central cell area. In this case, only the monitoring channel is transmitted over all sectors of the central cell area, but the speech channels are transmitted over only one sector, the reception field strength of the individual sector aerials being applied as a selection criterion.

It is within the scope of the invention to couple the additional channel units to a base station controller. The outputs/inputs of the additional channel units opposing the coupled decentral transceiver stations according to the system are connected in parallel in order to relay telephone conversations to conventional channel units and are connected via a radio link connection and/or via cable to a base station controller.

In the case of a transceiver station suitable for decentral coupling, in addition to the aerial(s) for the area coverage, a directional aerial or optical transmitter-receiver is available for bidirectional data relay to a further base transceiver station. This makes the costly, labour-intensive laying of a coupling cable between the mutually remote base transceiver stations superfluous. At least at the decentral transceiver stations, an aerial with a directional characteristic should be used in order to keep the transmission power for the coupling connection as low as possible in order to avoid interference.

It has been found advantageous that the two aerials (groups of aerials) are coupled together via two frequency-selective amplifiers connected in antiparallel. According to the bidirectional data transfer, amplification of the radio signals in both directions is necessary. The two signal directions are usually distinguished by the use of different frequencies, which is effected by frequency-selective band filters connected upstream of the amplifiers.

According to the invention, a respective frequency converter is inserted between the frequency filter assembly and the amplifier connected downstream. This embodiment makes possible the use of different frequencies for the area coverage of the respective decentral cells as well as for coupling to the central transceiver station, whereby acoustic feedback and consequent faults are highly reliably eliminated.

A transceiver station according to the invention for decentral coupling further has a superordinate assembly for configuration, initialisation and monitoring. This assembly should above all simplify the service and therefore has no influence on the radio signal to be relayed, apart from a purely monitoring function during operation. This signal is solely amplified, and if necessary its frequency is converted, by a decentral transceiver station, but otherwise is transmitted in an unchanged form.

Highly advantageously, in order to supply power to a base transceiver station of this type, for decentral coupling solar cells can be used. Due to the low transmission power and the minimum configuration of the electronic assemblies, the power take-up of a base transceiver station of this type for decentral coupling is several times smaller than the power take-up of conventional base transceiver stations. If solar cells are used, a transceiver station of this type is fully independent, so that after installation at the site concerned, no connection to any service lines is necessary. The installation of such a decentral transceiver station is therefore extremely labour-saving.

It has been found advantageous if all assemblies, with the exception of the aerial or possible solar cells, are housed in a housing, which acts as a pedestal for the aerial(s) for the area coverage and/or for the directional aerial. This pedestal has preferably a very flat form with a base area of e.g. 1 square metre and a height of approximately 20 cm. Due to the low number of necessary assemblies, particularly in the region of the housing edge, sufficient space still remains for receiving ballast elements to increase the stability of the aerial(s).

In an advantageous further embodiment, the aerial(s) for the area coverage are connected detachably via a plug-in mechanism to the housing acting as a pedestal. In this case, after installation of the pedestal-type housing at a favourable site, e.g. on the roof of a block of flats, the area coverage aerial can be inserted into the pedestal so that mechanical assembly is limited to only a few manual operations. Then, all that remains each time is to connect the aerial to an electricity supply.

Finally, according to the teaching of the invention, the directional aerial is disposed on its own fixing device and is connected via a connecting cable to the housing. In order to avoid acoustic feedback, the directional aerial is installed at a site a few metres away and to this end requires its own fixing device. After this aerial has been connected to the electronic equipment, all that remains to be done are adjustments.

In the arrangement described above, it may prove disadvantageous if the base transceiver stations coupled to the base station controller have their own cell which is surrounded by further cell areas. This means that, in addition to the frequencies required for the outer cell areas, further, different frequencies are required for the central cells, so that although the above arrangement is an improvement over the prior art, on the whole it is not the best solution, it is therefore a particular concern of the invention, on the basis of the above-mentioned arrangement, to permit a more extensive reduction in the number of frequencies required without restricting the advantages achieved with the first arrangement.

To this end, the invention proposes, in an arrangement of base transceiver stations of a continuous radio network whose area is divided into a large number of cell areas each with uniform transmission frequencies, wherein mutually adjacent cell areas are operated at different transmission frequencies, that at least the cell areas which are operated at a specified transmission frequency range are formed of a plurality of cells whose areas are covered by a respective base transceiver station, each base transceiver station being allocated to only one cell area.

The invention therefore dispenses completely with dividing an elementary radio region into a central and a peripheral area. The individual cell areas can therefor—e.g. as in a honeycomb with hexagonal cells—be joined together directly without the interposition of additional "central", cell areas which would have to have different frequencies from all the surrounding cell areas. It has turned out that ideally an arrangement can be achieved in which only every three cell areas need different frequencies, which are repeated periodically in the remaining cell areas, but not those directly adjacent thereto.

By dividing the individual cell areas into a plurality of cells which are covered by a respective base transceiver station, the transmission power of the individual transceiver stations can be further reduced, so that the range of the signals transmitted in a cell area is significantly smaller than in conventional arrangements, in which only a single radio station was provided in such a cell area. Therefore, the common frequency distance, i.e. the ratio of the reception field strength of a signal transmitted in one cell area to the reception field strength of the signal radiated at the same frequencies from the aerials of the closest cell area, is significantly reduced and fault-free operation is possible. In cell areas with only one central transmission aerial, on the other hand, the interference is so great that its use hitherto has only been practical if the frequencies were repeated, not even in the next-but-one cell area, but at greater distances, so that a large number of different transmission frequencies were necessary. Thus elementary cell regions used in practice have at least seven, but usually significantly more cell areas with different respective transmission frequencies.

Finally, it is important that each base transceiver station is allocated only one cell area. This makes it possible to install the individual transceiver stations at the optimum site for one cell area, so that the search for a site is generally unproblematic. In particularly unfavourable cases, where it is not possible to install the transceiver station at a desired site, by way of compensation one or more extra transceiver stations can be inserted in order to fill up any gaps in the radio network. It is also possible at points with a particularly high level of traffic to install extra transceiver stations in order thus to obtain a better distance between common channels. In the prior art, this was only possible at great cost with only one transceiver station per cell area, since an extra transceiver station with its own transmission frequencies was required, which necessitated a complete change in the geometry of the network. In the present arrangement, however, neither the transmission frequencies of the cell areas nor the neighbourhood lists are changed.

In a preferred embodiment of the invention, in which the cell areas have an approximately hexagonal shape and join together in lines to form a continuous radio network with an approximately honeycomb-shaped structure, optimum use of the transmission frequencies can be achieved if these are divided into three bands in all, each cell area being allocated transmission frequencies from only one of these transmission frequency bands. Since the frequencies available only have to be divided into three bands, on the whole a very high number of frequencies is produced within a cell area, so that a relatively large number of channels can be used per cell area. Unlike the prior art, where in an elementary region comprising twenty cell areas with different transmission frequencies, for example, only approximately 5% maximum of the total transmission frequencies available can be used, according to the invention an increase in efficiency of 33% can be achieved.

An almost equally high level of efficiency can be achieved in a radio network according to the invention if the cell areas have an approximately rectangular shape and are joined together without gaps into an approximately chessboard-type radio network, because in this case the available transmission frequencies only have to be divided into four bands in all, with transmission frequencies from only one of these transmission frequency bands being allocated to each cell area. Thus 25% efficiency can still be achieved.

Further advantages can be achieved if the base transceiver stations located at the periphery of a cell area have a smaller mutual distance than base transceiver stations located in the centre of the cell area. Base transceiver stations whose cell is completely surrounded by cells with the same frequency range and consequently lie in the interior of a cell area have their transmission signal amplified by the transmission of adjacent stations, so that their range is increased without the need for greater transmission power. Since this amplifying effect is not available in the peripheral cells, because there cells border other channels at least in part, either the transmission power must be increased, or if this is not possible, the distance from the transceiver stations of the adjacent cell area must be reduced in order that the reception field strength does not fall below a minimum value in the border region between the two cell areas.

The invention further proposes that the base transceiver stations located at the edge of a cell area have a lower transmission power than base transceiver stations located in the interior of the cell area. The purpose of this measure is to minimise common channel interference between the closest cell areas having the same frequencies by operating the transceiver stations which are closest to one another at the peripheries at a reduced transmission power. Although the closest transceiver stations of two adjacent cell areas therefore have to be moved closer together, this has no adverse effects, since the cell areas are operated at different frequencies.

The invention can be particularly advantageously improved if a plurality of base transceiver stations are coupled via an allocated central station to a base station controller. This makes it possible to reduce the hardware costs in coupling the individual transceiver stations, so that their number can be increased in an economically practical manner.

By not giving the central stations effecting coupling to the base station controller their own cells, it is possible to install these central stations on sites selected solely by the criterion for a favourable connection of the associated base transceiver stations. This avoids the potential problem in the main application of having to select the sites for the central radio station for their favourable connection to the decentral transceiver stations on the one hand, and for an optimum area coverage of the inner cell on the other hand. The remaining single criterion can usually be met without much difficulty. If all the conditions are simultaneously favourably met, a base station and a central transceiver station can be installed on the same site, permitting coupling via cable.

Further advantages can be achieved if each central station is allocated all the base transceiver stations of one or more cell areas. This makes it possible to make available for all base transceiver stations of a cell area common channel units for coupling to the base station controller, which are disposed within the associated central station. These channel units must consequently only be available once for each cell area, in particular in the associated central station. This permits a reduction in hardware costs.

It has furthermore proved advantageous if in the central stations at least one respective running time element is provided, which is started by the transmitter of a channel unit and after the elapse of its time constant actuates the receiver of the respective channel unit.

It is also advantageous that each central station is coupled via a point-to-point connection or an area-to-point connection to the associated base transceiver stations. These may be bidirectional radio connections, radio link connections with an omnidirectional and a directional aerial, or optical connections by means of laser beams or the like.

The invention can be further simplified if for all base transceiver stations of a cell area one common aerial is available at the central station. This may be an omnidirectional aerial for the cell area within which the respective central station is installed, whilst the aerial for connecting more remote cell areas can have a directional characteristic, albeit covering a corresponding angle of transmission in order to respond to all transceiver stations within this cell area.

It is within the scope of the invention that the frequencies used in the connection of the base transceiver stations to the associated central station correspond to the frequencies for the area coverage of the cell area concerned. In such a case, one base transceiver station in particular provides amplification of the signal, so that in a base transceiver station of this type the connecting aerial and the aerial for area coverage can be coupled together direct via amplifiers connected in antiparallel.

If on the other hand the connection frequencies of the base transceiver stations differ from the frequencies for area coverage of the cell areas concerned, and therefore the connection frequencies lie respectively in a radio link band, then the base transceiver stations must have in addition to the amplifiers connected in antiparallel between the connecting aerial and the area coverage aerial frequency converters connected upstream of the amplifiers.

For both embodiments, a further development of the invention is suitable in which, in one or both transmitting and receiving branches connected in antiparallel a time-lag device with an adjustable time constant is connected. In particular in cell areas more remote from the associated central station effecting coupling to a base station controller, the problem arises that the different transceiver stations of this cell area may have different distances from the associated connection station. Thus running time differences can arise, which within the cell area would lead to asynchronous transmission so that, for example, the desired amplifying effect is not achieved. This adverse consequence is counteracted by the invention in that, in the transceiver stations sited closer to the connecting aerial, a greater time-lag is set than in the more remote transceiver stations. Thus a signal is still transmitted simultaneously from all transceiver stations of this cell area.

In order to eliminate the running time problems just discussed, the invention proposes that the time constant of a time function element in the central station corresponds to the sum of twice the running time between the central station and the most remote base transceiver station, twice the signal running time through a base transceiver station with the time-lag set at the minimum, and a fixed, predetermined reaction time. Since in the arrangement according to the invention the distances between a cell area and the connection station allocated thereto may sometimes be relatively great, the increased running time over this distance must be allowed for by not actuating the receiver of a channel unit until a significantly larger time constant has elapsed than in known arrangements where the channel unit is located right in the base transceiver station. The time constant according to the invention must also take into account the running time corresponding to the distance between the connecting and the base transceiver station, as well as the signal running time within the base transceiver station.

Furthermore, the individual base transceiver stations of a cell area must be synchronised by setting the time-lag of each of the two time-lag devices of a base transceiver station to the differential in the running time between the central station and the most remote base transceiver station of the same cell area on the one hand, minus the running time between the central station and the respective base transceiver station on the other hand. By dividing the time-lag up evenly between two time-lag devices, one of which is connected in the transmitting branch and the other in the receiving branch, it is achieved that both the area-covering signal directed to a mobile statio is transmitted from all base transceiver stations of the same cell area simultaneously, so that the advantageous superposition effect is achieved. On the other hand, the directional radio signal to the connection station is transmitted from all participating base transceiver stations simultaneously, so that a signal accumulation is achieved and a relatively high signal-to-noise ratio at least can be achieved.

A base transceiver station suitable for the radio network concept according to the invention and which is provided with a connecting aerial as well as an aerial for the area coverage—in which case the aerials are coupled together via transmitting and receiving branches consisting of a respective amplifier and if necessary a frequency converter connected in antiparallel between the aerial filters—is characterised in that a time-lag device with an adjustable time constant is connected in the transmitting and/or receiving branch. Thus a universally applicable transceiver station is achieved, in which the time-lag corresponding to the different distances from the connecting station can be individually set.

In order that both the area-covering radio signals transmitted from the base transceiver stations of a cell area and the connecting radio signals can be synchronised, the invention further proposes that two time-lag devices with an adjustable time constant are provided, one of which is connected in the transmitting and one in the receiving circuit. By means of these two time-lag devices, the different signal running time in a respective relay direction is compensated.

It is within the scope of the invention that the two time-lag devices are connected to the inputs and/or outputs of the transmitting and receiving branches coupled to the connecting aerial.

Particularly for the close vicinity of a connecting station, i.e. the cell area in which the connecting station is installed, running time compensation may be dispensable since in this case the running time differences may be smaller. In this case, the time constant of the time function element in the connecting station can also be relatively small.

Independently of the presence of one of more time-lag devices in the transmitting and receiving branch of a base transceiver station, it has proved advantageous if in the receiving branch a device for detecting the field strength of the signal received is provided, which closes a switch incorporated in the transmitting branch if a threshold value is exceeded. This measure makes it possible to actuate in a predetermined manner only the transceiver stations of a cell area in whose cell a mobile station is in fact located, since only here is a radio contact required. By disconnecting the remaining transceiver stations, the overall transmission power being transmitted is reduced, so that common channel interference with the closest cell area sharing the same frequency is significantly reduced.

In this case it is practical if the threshold value is at or slightly below the reception field strength corresponding to the signal of a mobile station located at the periphery of the cell concerned. Thus the field strength detector according to the invention can reliably determine whether the mobile station concerned is located inside its cell, thus ensuring a continuous radio transmission. If a mobile station is located at the border between two cells, it is recognised by both detectors of these adjacent cells and both transceiver stations are actuated. Thus the above-mentioned amplification effect is produced in this border region, so that even in the case of such mobile tracking, advantageous signal amplification is maintained.

It has been found advantageous if the switch is opened by the reception field strength detector when the signal is below a further threshold value. If this second threshold value is below the first threshold value, a hysteresis is obtained which ensures stable operation even at the periphery of a cell.

BRIEF DESCRIPTION OF THE DRAWINGS

Further features, details and advantages on the basis of the invention will appear from the following description of a few embodiments of the invention and from the drawing, in which.

DESCRIPTION OF THE PREFERRED EMBODIMENTS

Figure 1:
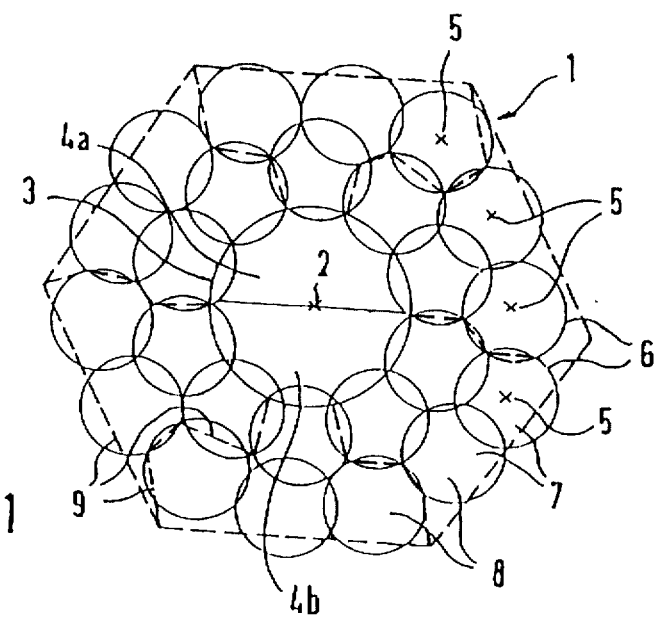
FIG. 1 shows a cell having an approximately hexagonal basic shape.

FIG. 1 shows an elementary cell 1, a large number of which can be joined together in lines to form an area-covering radio network having an approximately honeycomb structure. In the centre of the cell 1 is a base transceiver station 2, which is coupled via cable or radio link to a base station controller (not shown). By means of two directional aerials having a range 3, the central transceiver station 2 serves the inner cells 4a and 4b. Within the cells 4a or 4b, a mobile station (not shown) communicates direct with the central transceiver station 2.

In the case shown in FIG. 1, the central transceiver station 2 is surrounded by decentral transceiver stations 5, each having an identical range 6. In the arrangement shown in FIG. 1, the ranges 6 of the decentral radio stations 5 are approximately half as large as the range of the central radio station 2, which is achieved by suitable setting of the levels of transmission power. Thus the ideally circular cells 7 of the decentral transceiver station 5 are approximately half the radius of the central cell 4a, 4b. The decentral transceiver stations 5 are so arranged that their cells 7 complement one another to form two rings concentrically surrounding the central cell 4a, 4b.

In the decentral cells 7, communication with a mobile station via different transmission frequencies from the inner zones 4a, 4b takes place. However, according to a preferred embodiment of the invention, not every decentral cell 7 has its own transmission frequency. Rather, a plurality of adjacent transceiver stations 5 can be grouped into cell areas 8, whose border lines 9 in FIG. 1 are indicated by broken lines. The decentral transceiver stations 5 of the cells 7 allocated to the same cell area 8 communicate with the mobile station at identical transmission frequencies. The cell region 1 shown in FIG. 1 accordingly has two central and six decentral cell areas 4a, 4b, 8, in which different transmission frequencies are used in pairs. However, any number of cell regions 1 can be linked together in rows to form a honeycomb-shaped radio network, in which the division of individual cell regions 1 into cell areas 8 and the frequency allocations in the individual cell areas 8 can be fully identical.

Figure 2:
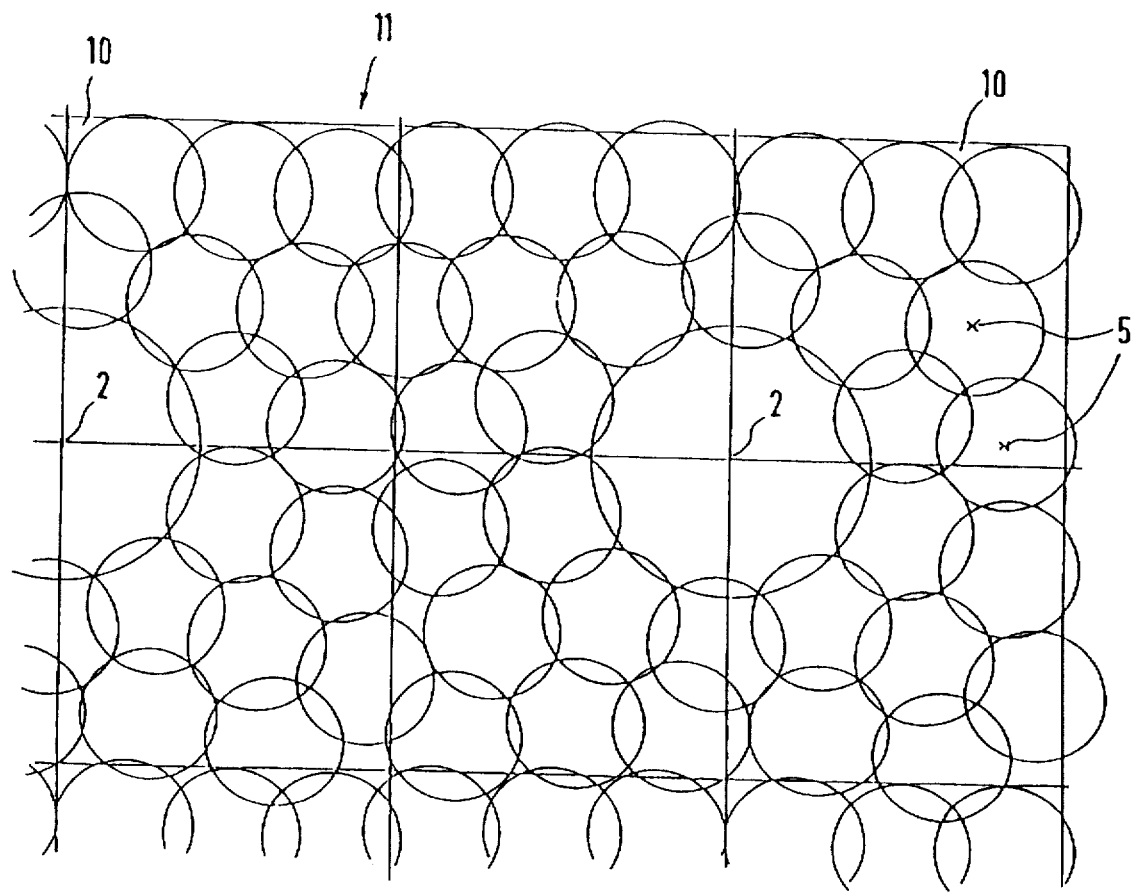
FIG. 2 another embodiment of a cell according to the invention having an approximately square basic shape, supplemented along two of its border lines by identical cells to form an area-covering network, FIG. 3 the radio network as in FIG. 2 on a different scale, in which for the sake of clarity the decentral cells are not shown, FIG. 4 a block diagram of a central and of a decentral radio station, FIG. 5 a detail of the block diagram of a further embodiment of a central transceiver station, FIG. 6 a perspective diagram of a decentral transceiver station, FIG. 7 a detail of a radio network according to a further embodiment of the invention, FIG. 8 a detail of a radio network of another embodiment of the invention, FIG. 9 a cell at the periphery of a cell area, FIG. 10a the signals transmitted from the connection statio of a cell area plotted along the time axis, FIG. 10b a diagram of the reply signals received by the same connection station, corresponding to the diagram of FIG. 10a, FIG. 11 a block diagram of a base transceiver station for an arrangement according to the invention.

FIG. 2 shows a cell region 10 with a different basic structure. Here also, a central transceiver station 2 is surrounded by decentral transceiver stations 5 in an approximate ring, but instead of a hexagonal basic shape, the cell region 10 has an approximately square basic shape. To form an area-covering radio network 11, a plurality of square cell regions 10 are joined together in rows to form a rectangular grid network. As can be seen from FIG. 2, in this case the cells 7 of the individual decentral transceiver stations 5 join up to form a homogeneously closed radio network 11.

Figure 3:
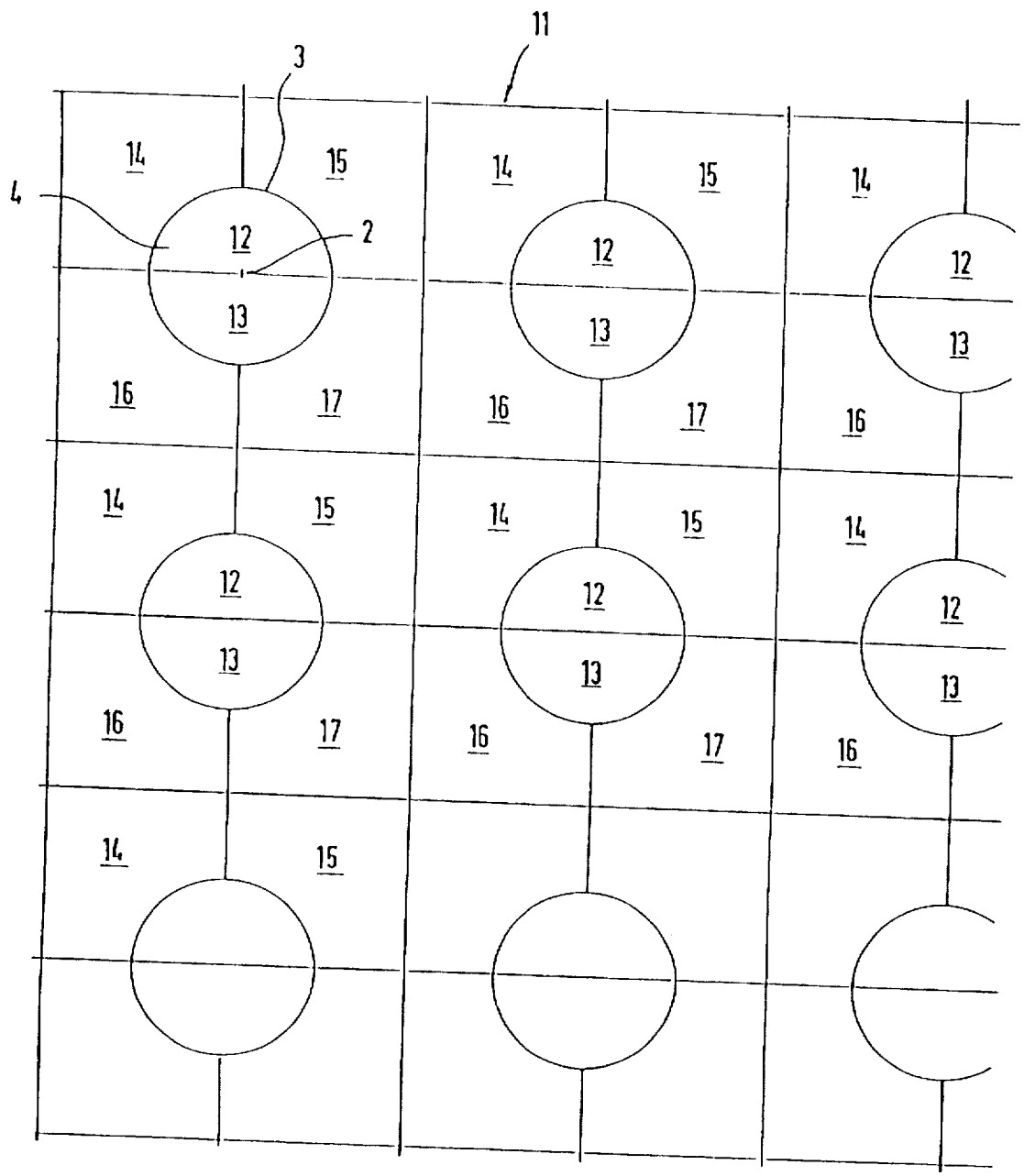

FIG. 3 shows a larger detail of the radio network 11 in which the individual cells 7 are no longer indicated, but only the cell areas 12–17, within which constant transmission frequencies are used. As is known, none of these cell areas 12–17 borders another cell area 12–17 having an identical frequency. In this embodiment, the cell area of the central transceiver stations 2 is divided into two cells 12, 13 having different transmission frequencies by means of two directional 180° aerials, in order to achieve a longer range 3 of the central cell area 4. Thus six different cell areas 12–17 arranged in pairs having different transmission frequencies are achieved.

As can be seen from FIG. 2, the area of the cells 4a, 4b of the cost-intensive transceiver stations 2 coupled to a base station controller corresponds roughly to a ninth of the total area. Consequently, the number of these cost-intensive transceiver stations can be reduced to approximately a ninth, which brings the extra cost of the very simple, decentral transceiver stations below the break-even point. Furthermore, the total number of cell areas arranged in pairs of two different frequencies with six in all is significantly smaller than in conventional grid structures, where the hexagonal cell regions of one transceiver station is divided into three sectors by the use of directional 120°-aerials, so that in all twelve (four-structure with 3 sectors each) to twenty-one (seven-structure with 3 sectors each) cell areas arranged in pairs with two different transmission frequencies are formed.

Figure 4:
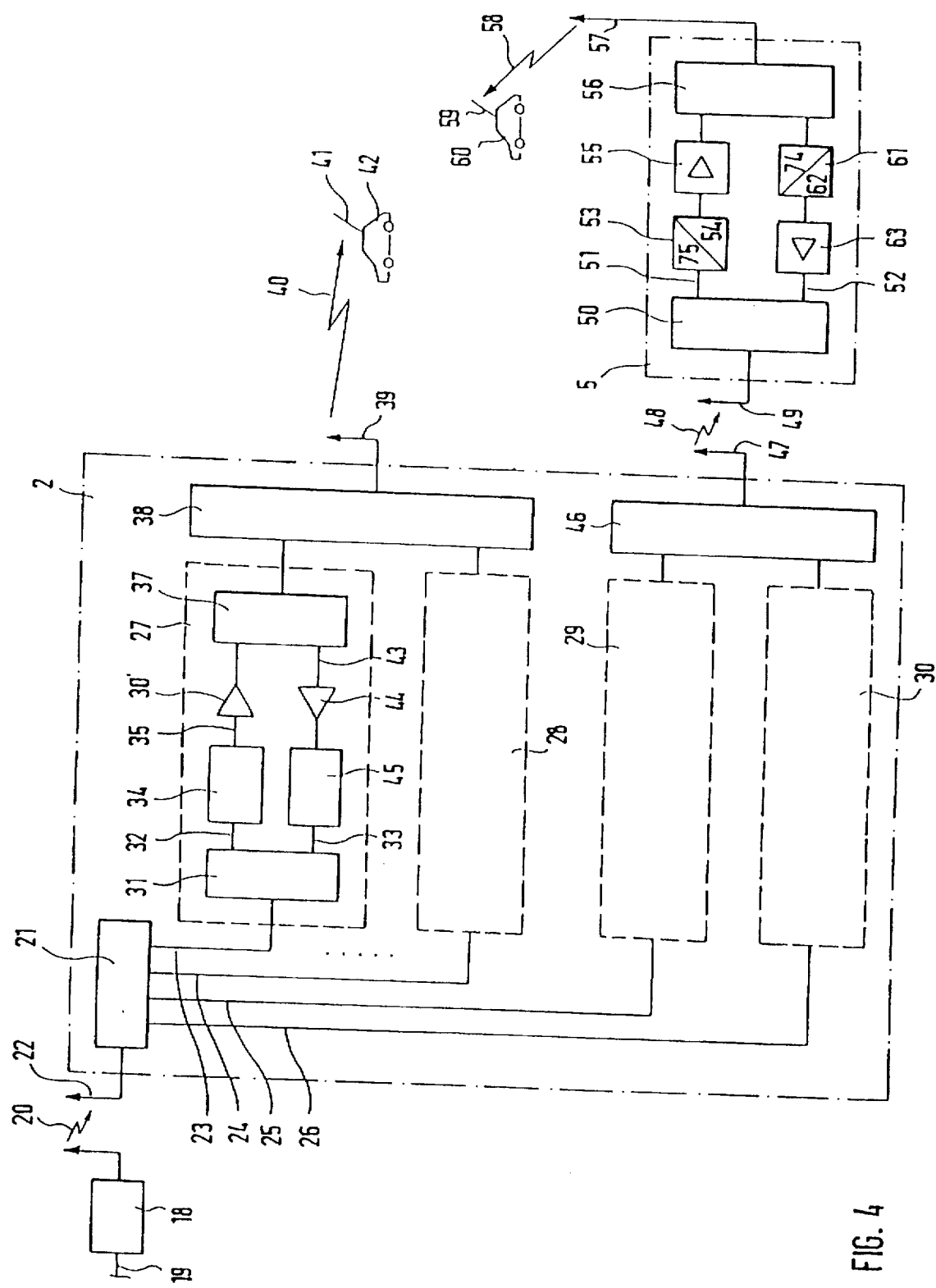

FIG. 4 shows a block diagram for a central transceiver station 2 and as an exceptional case only one decentral transceiver station 5. At the upper left-hand corner of FIG. 4, a base station controller 18 is shown which is connected for example to a mobile exchange.

The base station controller 18 communicates via a radio link connection 20 to the central transceiver station 2. In this transceiver station 2 is an interface component 21, which splits the signal received from the radio link aerial 22 into individual transmission channels 23 to 26.

To each transmission channel 23–26, a respective channel unit 27 to 30 is connected.

Each channel unit 27–30 comprises a terminal assembly 31, which separates the channel 23–26 concerned according to the direction of transmission and accordingly has two terminals 32, 33 on the down-link side. The terminal 32, which makes available the signals arriving from the base station controller 18 is connected to an encoder 34, whose output signal 35 is fed via an amplifier 36 to a band filter assembly 37, whence the signal leaves the channel unit 27 and is passed to a combiner 38 in order to be combined with the output signals of other channel units 28 and transmitted to an aerial 39 for area coverage of the central cell area.

Via an air interface 40, this transmission signal passes to the aerial 41 of a mobile station 42, for example in the form of a mobile telephone. The reply signal of the mobile station 42 is transmitted in the reverse direction via the air interface 40 to the receiving device 39 of the central transceiver station 2, where it is allocated to the respective channel unit 27, 28 via the combiner 38.

In the band filter assembly 37, the reception signal 43, which has a different frequency from the transmission signal 35, is separated therefrom and sent to the input of an amplifier 44. This is connected on the output side to a decoder 45, in which the signal received is processed and sent via the terminal 33 to the terminal assembly 31 of the respective transmission channel 23, 24. Via the interface component 21, the radio link connection 20, the base station controller 18 and the mobile exchange 19, the reply signal is fed into the conventional telephone network. Apart from the division into smaller sectors, the central cell area 4a, 4b is served in much the same way as conventional transmission devices.

In contrast to these, in the central transceiver station 2 according to the invention, further channel units 29, 30 are provided, which are connected to corresponding relay channels 25, 26 of the interface component 21. These channel units are no different in their basic equipment from conventional channel units 27, 28, but have different transmitting and receiving frequencies. They are coupled on the output side to a transmitter-receiver 47 via a combiner 46.

In contrast to the transmitter-receiver 39 for the central cell 4, in this case however an aerial 47 with a strongly directional character is used, so that the air interface 48 takes the form of a true radio link connection, in which case the transmitter-receiver 49 of the decentral transceiver station 5 on the up-link side has a corresponding, directional aerial.

The aerial 49 is connected to a band filter assembly 50, which by means of the different frequencies distinguishes the signal 51 arriving from the central transceiver station 2 from the signal 52 directed towards the central transceiver station 2. The transmission signal 51 is fed to a frequency converter 53, whose output frequency 54 corresponds to the transmission frequency of the respective cell area 8. The transmission signal having the frequency 54 is then amplified in an amplifier 55 to a transmission power which ensures the necessary range 6, and is transmitted via a band filter component 56 on the output side and a transmitter-receiver 57 connected in series. Via the air interface 58, this transmission signal passes to the aerial 59 of a mobile station 60 which is located within the cell 7 of this decentral transceiver station 5.

The reply signal of this mobile station 60 is picked up by the receiver device 57 and separated from the amplified transmission signal 54 by the band filter assembly 56. Then it is transformed by a further frequency converter 61 into a frequency range 62 which is used for the radio link connection 48. After amplification by the amplifier 63, this signal 52 is sent via the input-side band filter 50 to the radio link aerial 49. The signal 48 transmitted therefrom is received by the complementary radio link aerial 47 of the central transceiver station 2 and is allocated from there in the combiner 46 to the corresponding channel unit 29, where apart from other transmission frequencies it is processed just like the signal 40 received from the aerial 39 in the inner cell 4. The reply signal passes via the interface component 21, the radio link connection 20 and the base station controller 18 into the telephone network.

In addition to this standard variant, in the channel units 29, 30 communicating with a decentral transceiver station 5 a time function element can be incorporated, which is started by the decoder 34 and after expiry of the time interval set actuates the encoder 45 in order to compensate the constant running times on the radio link section 48.

Figure 5:
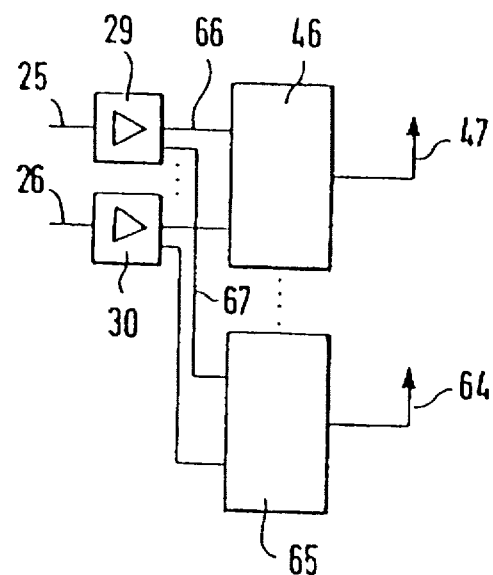

If a plurality of decentral cells 7 are grouped into one cell area 8, all the transceiver stations 5 thus grouped can be addressed via a common aerial 47 of the central transceiver station 2. In addition, however, it is possible to provide for each of the decentral transceiver stations 5 its own directional aerial 47, 64 (cf. FIG. 5). In order to transmit a plurality of channels 25, 26, each of these directional aerials 47, 64 must have its own combiner or coupler 46, 65 connected upstream.

In order to avoid interference, selection switching circuits (not shown in FIG. 5) are integrated into the extra channel units 29, 30, which selection switching circuits compare the signal amplitudes ascribable to different reception field strengths on the down-link-side inputs 66, 67, which are allocated to different radio link aerials 47, 64 and thus to different transceiver stations 5, and in down-link transmission select only the transmission aerial 47, 64 in which the highest reception field strength was registered. Thus although a plurality of cells 7 are combined into a common cell area 8, only that transceiver station 5 is ever actuated in whose cell 7 the mobile station 60 is located at that moment. Thus the heterodyning of several signals of the same frequency on the air interface 58 is avoided.

Figure 6:
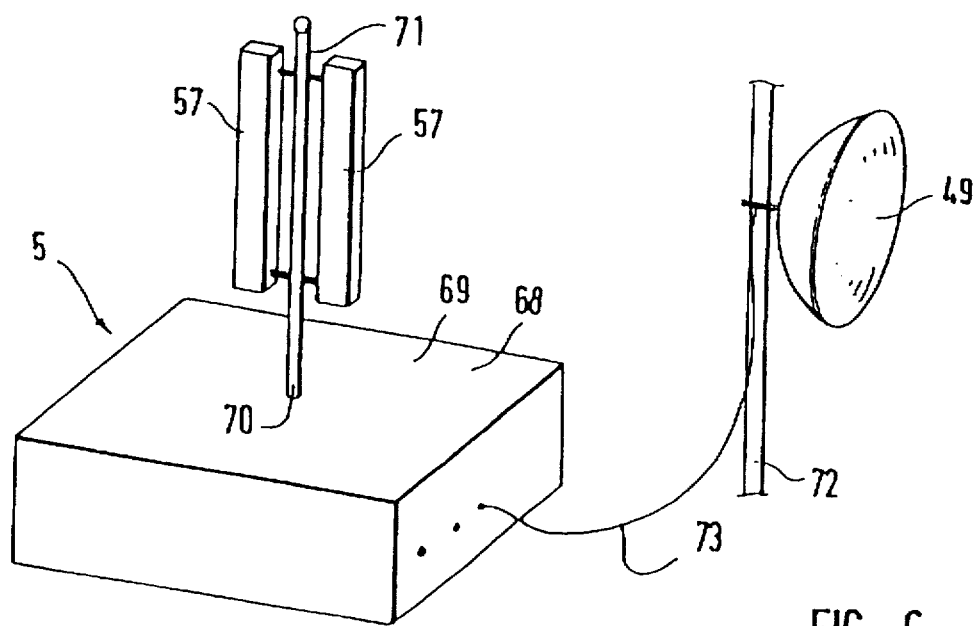

A constructive configuration of a decentral transceiver station 5 is shown in FIG. 6. A flat housing 68 with a base area of approximately 1 square metre and height of approximately 20 cm has approximately centrally on its upper face 69 a plug-in device 70 for a transmission mast 71, on which two transmitting and receiving aerials 57 are located, each having a directional characteristic of 180°. This aerials 57 are oriented in opposite directions, so that together they cover a cell 7 with an approximately circular circumference. In order to reduce interference, the aerials 57 can be inclined at a slight angle so as to converge at the bottom. The connection of the aerials 57 to the housing 68 is effected by means of cables (not shown).

A directional transmitting and receiving aerial 49 for the air interface 48 to a central transmission station 2 is mounted on a post erected at a distance and is connected to the housing 68 via a cable 73. Due to the low transmission power of the aerials 49, 57 and the minimal configuration of the electronics components within the transmission station 5, the current supply can be ensured by means of solar cells disposed on the upper face 69 of the housing 68.

Figure 7:
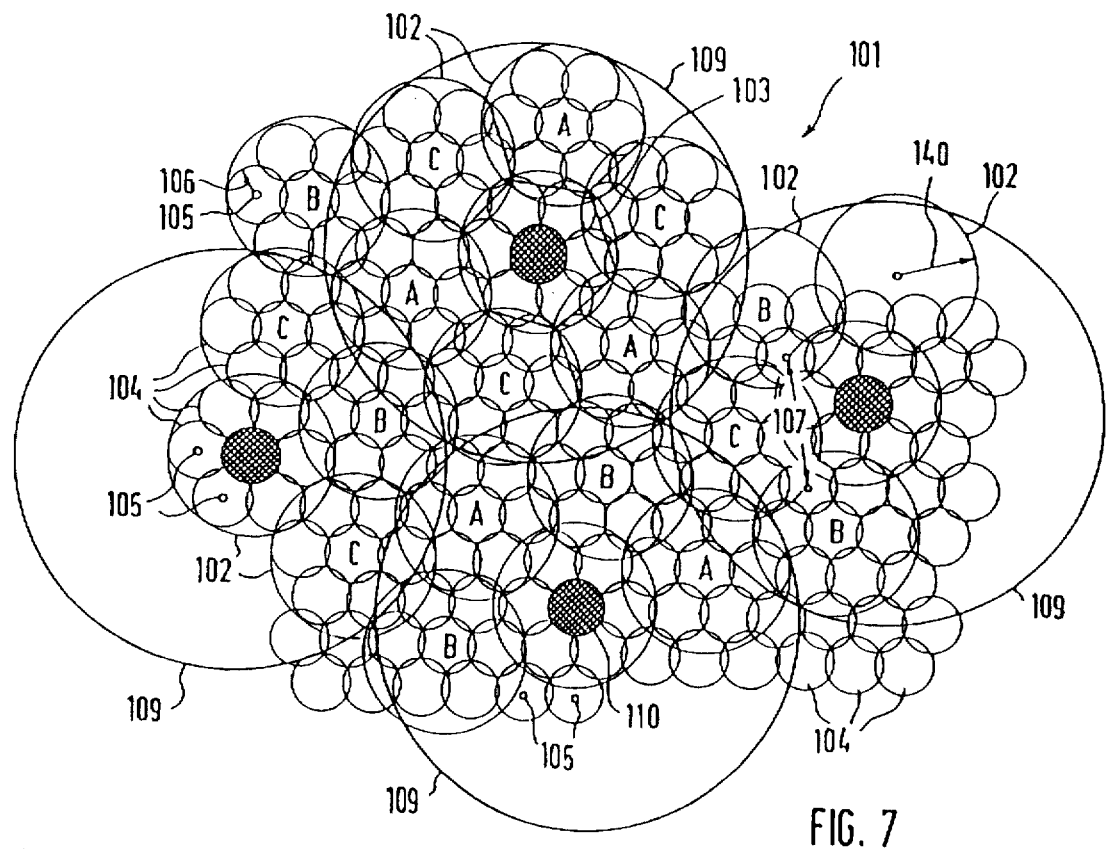

FIG. 7 shows a detail of a radio network 101. It shows a large number of cell areas 102, which join one another continuously so that an individual cell area assumes the approximately hexagonal shape of an individual honeycomb cell 103. Each cell area 102 can be circumscribed by a circle of radius 140.

Mutually abutting cell areas 102 have different frequencies. Thus for example the cell area 102 characterised by A can be operated in a first transmission frequency range, the cell areas 102 referenced B are operated in a second transmission frequency range, and the cell areas 102 referenced C are operated at a third transmission frequency range. As can be seen, accordingly three transmission frequency ranges A, B and C are sufficient to create a radio network 101 with continuously abutting cell areas 102, in which adjacent cell areas 102 are allocated different transmission frequency ranges A, B or C.

In the embodiment shown in FIG. 7, each cell area 102 is divided into seven cells 104 in all, although this is not obligatory. The cells 104 have to be arranged within a cell area 102 not according to a predetermined geometric grid, but are arranged in a row in such a manner that continuous coverage of the entire cell area 102 is ensured. It is also possible to create relatively large cell areas 102 in which a central cell 104 is surrounded not by a single ring of approximately six peripheral cells 104, but for example of two such rings, so that on the whole approximately nineteen cells 104 per cell area 102 are formed.

Due to the grouping together of a plurality of cells 104 into cell areas 102 having uniform transmission frequencies A; B; C; the mutual interference even in the case of transceiver stations 105 lying in different cell areas but operating at the same transmission frequency, e.g. B, and having the minimum distance 107, is so slight that interference-free operation of the radio network is ensured. This is because the spacing of such transceiver stations 105 which are particularly sensitive to common channel operation corresponds at least approximately to the radius 140 of a cell area 102, whilst the radius 106 of a cell 104 on the contrary can be reduced to almost any size by increasing the number of transceiver stations 105 per cell area 102.

All the transceiver stations 105 of a cell area 102 are coupled via a common connecting station 108 to a base station controller not shown. In order to reduce the cost of hardware, a plurality of cell areas 102 are associated with the same connecting station 108. Although preferably an approximately hexagonal structure 109 of the cell areas 102 respectively coupled to a common station 108 is again preferred, this is not obligatory. Furthermore, the potential sites 110 for the connecting stations 108 can be varied within the shaded area, for example, without changing the hexagonal structure 109.

Figure 8:
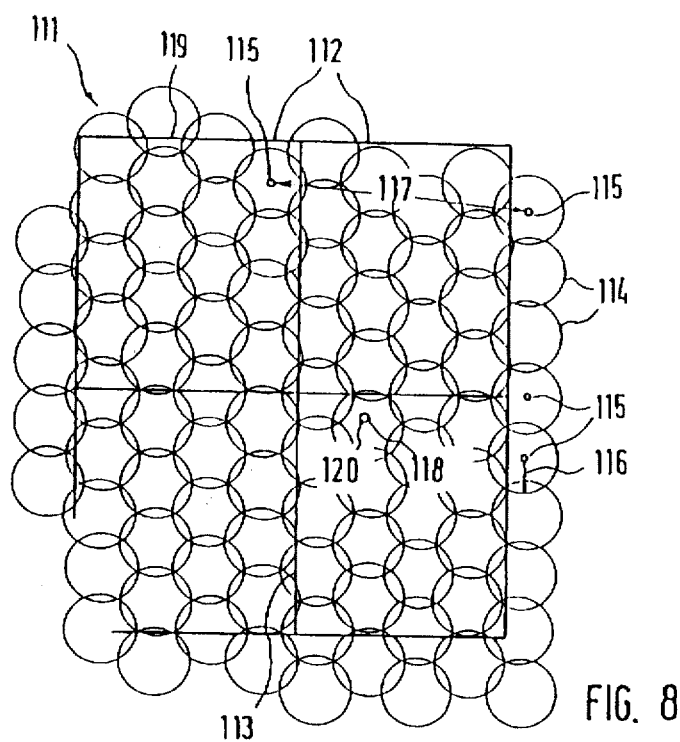

In the detail from a radio network 111 shown in FIG. 8, the cell areas 112 have an approximately rectangular structure 113. It is not important how the cells 114 are arranged within these cell areas 112; but again, a hexagonal structure similar to the one in FIG. 7 is an option. In this case also the transceiver stations 115 are located respectively in the centre of a cell 114; the range 116 corresponds to the radius of these cells 114. The minimum distance 117 between two transceiver stations 115 composed of different cell areas but with the same transmission frequency range is slightly larger than one edge of the rectangle 113. However, this distance 117 is entirely adequate to ensure interference-free radio operation due to the small ranges 116. In this case also, a plurality of cell areas 112 are coupled via a common connecting station 118 to a base station controller not shown.

In this case, for example, four cell areas 112 can be allocated to one connecting station 108, so that their field of influence in each case has an approximately rectangular shape 119. The site 120 of the connecting station 118 can be moved to virtually anywhere within the area of this rectangle 119 or even beyond that area if coupling is effected via an aerial with a strongly directional characteristic, although obviously the region in the centre of the rectangle 119 is preferred, because from there the minimum running time of the connecting signal to all transceiver stations 115 is achieved.

Figure 9:
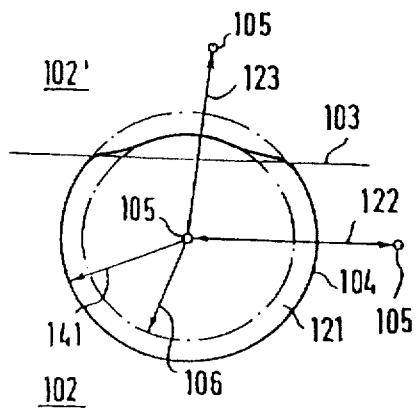

FIG. 9 shows a detail of a cell 104 on an enlarged scale, which is located on the hexagonal edge 103 of its cell area 102. Within its cell area 102, the adjacent transceiver stations 105 transmit the same radio signal, so that in the peripheral region 121 between two such adjacent transceiver stations 5 a signal accumulation and therefore effective enlargement of the range 106 by approximately 15% for example to a radius 141 is obtained.

Since the distance 123 between two adjacent transceiver stations 105 composed of different cell areas 102, 102' must be smaller than twice the normal radius 106 of a cell 104, but the distance 122 between adjacent transceiver stations 105 within the same cell area 102 must be smaller than twice the radius 141 of a cell 104 enlarged by the signal accumulation, the distance 122 between two transceiver stations 105 of the same cell area 102 can be larger than the distance 123 to a transceiver station 105 in the adjacent cell area 102', which is operated at a different transmission frequency range.

Figure 10A:
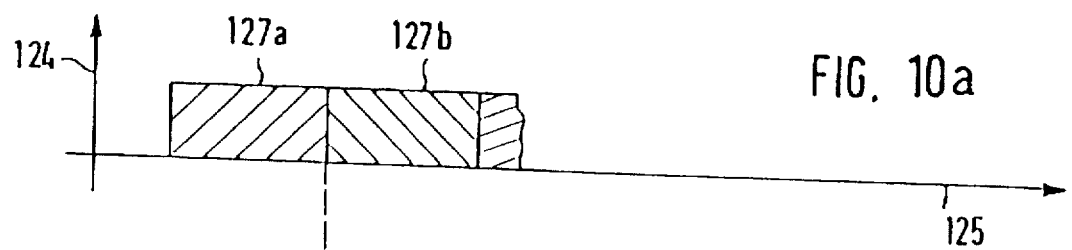
Figure 10B:
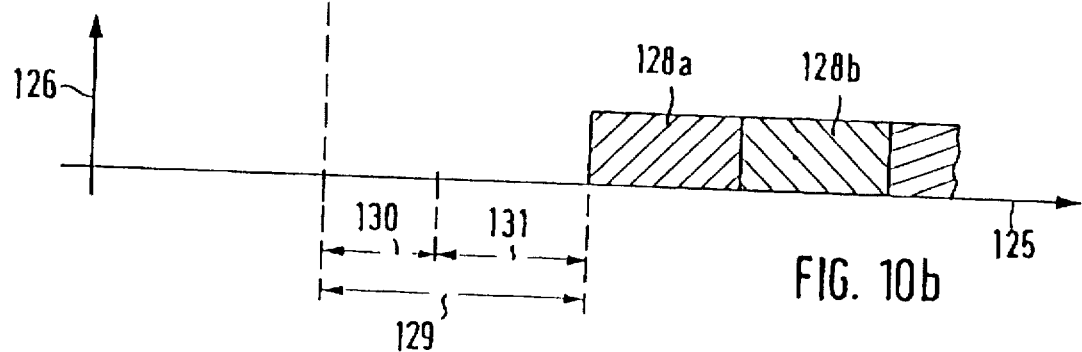

In FIGS. 10a, 10b the transceiver station 124 transmitted from a connecting station 108, 118 is plotted on the time axis 125, as is the signal 126 received from the same connecting statio 108, 118. It can be seen from FIG. 10a that the signals transmitted are divided according to different communication channels into individual time blocks 127a, 127b etc. The corresponding reply signals of the base transceiver stations 105, 115 being addressed are divided according to the same channel division into the time blocks 128a, 128b etc.

At the end of a transmitted signal block 127a, in the respective connecting station 118 a time function element with the time constant 129 is started and after expiry of this time constant 129 the receiving device of the respective channel unit is actuated in order to receive the reply signal 128a of this channel. The time constant 129 comprises on the one hand the time 130, which corresponds to the waiting time set in conventional transceiver stations and takes into account particularly the reaction time of a mobile station, and on the other hand an extra time interval 131, which takes into account in particular twice the signal running time between the respective connection station 108, 118 and the base transceiver station 105, 115 furthest therefrom but coupled thereto.

This ensures that the most remote base transceiver station 105, 115 has sufficient time 129 to receive the signal block 127a, to relay it, to receive the reply signal from the mobile station and to send the reply signal back as a signal block 128a to the connecting station 108, 118.

Figure 11:
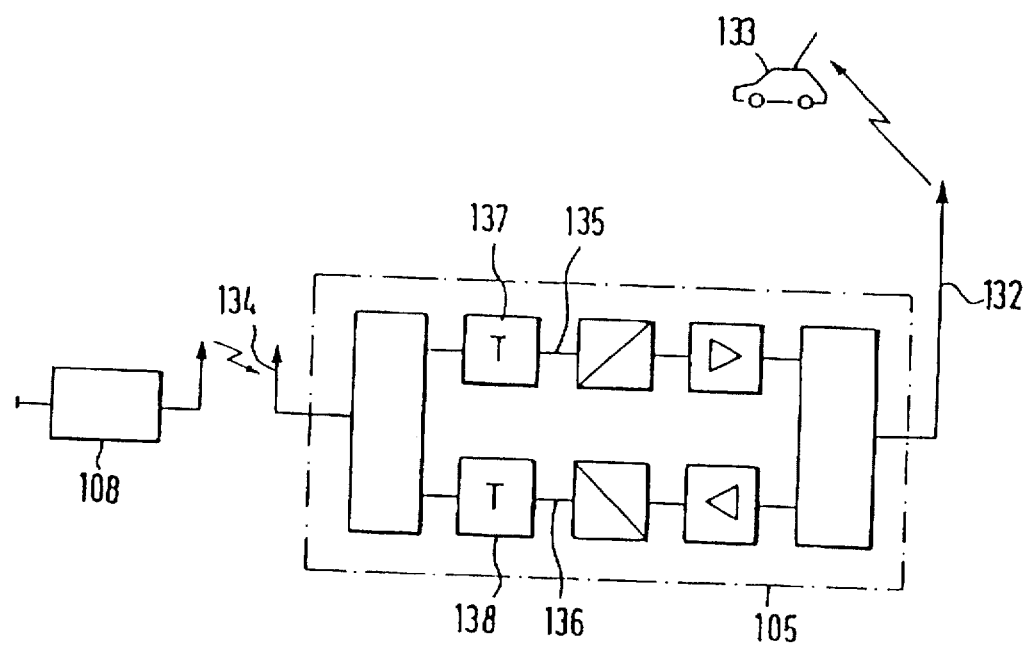

FIG. 11 shows a block diagram of a base transceiver station 105.

This shows the aerial 132 for area coverage of the associated cell 104, via which communication with a mobile station 133 located in this cell 104 takes place. On the other side an additional aerial 134 is provided which has a characteristic oriented towards the connecting station 108. Since the radio link connection 134 in the example shown lies in the radio link band, frequency conversion within the transceiver station is necessary. This assembly therefore has almost the same structure as the decentral transceiver station shown in FIG. 4 and referenced 5.

In contrast to this decentral transceiver station 5, in the present case both in the transmission branch 135 and in the receiving branch 136 of the base transceiver station 105, a respective additional time-lag device 137, 138 is connected. The time constants T of the time-lag devices 137, 138 are adjustable in a range corresponding approximately to the additional time interval 131 of the respective connecting station 108.

Since the time constants T of the time-lay devices 137, 138 of the transceiver station 105 most remote from the connecting station 108 are set at zero, but in the closest transceiver station 105 on the other hand are set at approximately half the time interval 131, it can be ensured that the signal received by the connecting station 108 is transmitted simultaneously by all transceiver stations 105 of the same cell area 102, so that the desired signal accumulation is obtained in the peripheral region 121. The signal transmitted as a reply by the mobile station 133 can also, if received by a plurality of transceiver stations 105, be transmitted synchronously via the directional aerials 134 to the connecting station 108.

I claim:

1. An arrangement of base transceiver stations in an area-covering radio network comprising cell regions arranged continuously in rows, each cell region comprising:
   (a) a central transceiver station coupled to a base station controller;
   (b) a plurality of decentral transceiver stations surrounding and coupled to the central transceiver station; and
   (c) a plurality of cell areas, each cell area operated at respectively different transmission frequencies, each cell area being formed by a plurality of adjacent, decentral transceiver stations to which the same transmission frequencies are allocated.

2. An arrangement according to claim 1, wherein transmission power of channel units for area coverage of the decentral transceiver stations is lower than transmission power of a channel unit for area coverage of a central cell.

3. An arrangement according to claim 1, wherein coupling of the decentral transceiver stations to the respective central transceiver station comprises a wireless point-to-point connection.

4. An arrangement according to claim 3, wherein frequencies of the point-to-point connections differ from the frequencies for the area coverage of a central cell.

5. An arrangement according to claim 4, wherein the point-to-point connections have a transmission power lower than transmission power for the area coverage of the central cell.

6. An arrangement according to claim 1, wherein the central transceiver station further comprises an aerial for area coverage and a directional aerial or optical transmitter-receiver device for the bidirectional data relay to a further base transceiver station.

7. An arrangement according to claim 6, wherein the two aerials are coupled together via two frequency-selective amplifiers connected in antiparallel.

8. An arrangement according to claim 7 and further comprising a frequency filter assembly and an amplifier connected in series, and having a respective frequency converter inserted between them.

9. An arrangement according to claim 1 wherein the central transceiver station has channel units for the area coverage and additional channel units for bidirectional data relay to at least one additional central transceiver station, each additional channel unit comprising:
   (a) a terminal assembly with two terminals on a down-link side for separating signals according to the direction of their transmission;
   (b) an encoder coupled to an output terminal at the down-link side of the terminal assembly;
   (c) a first amplifier receiving the output signal of the encoder;
   (d) a band filter assembly with two terminals at an up-link side, receiving at one of these terminals the output signal of the first amplifier, and with one terminal for transmitting and receiving signals to/from an aerial;
   (e) a second amplifier, which receives the signal output from the second terminal at the up-link side of the band filter assembly; and
   (f) a decoder at an output side of the second amplifier, which is coupled to the second terminal at the down-link side of the terminal assembly.

10. An arrangement according to claim 9, wherein the channel units have transmission devices having a transmission power and the transmission power of the transmission devices of the additional channel units is lower than the transmission power of the transmission device for area coverage.

11. An arrangement according to claim 9, wherein a transceiver station further comprises at least one directional aerial and/or optical transmitter-receiver and a time function element which is started by a transmitter device and after the elapse of a time interval actuates a receiver device.

12. An arrangement according to claim 9, wherein a transceiver station has at least one selection switching circuit for selecting an associated coupling aerial as a function of the reception field strength of a signal relayed by a plurality of coupled base transceiver stations.

13. A method of retrospectively condensing an existing area-covering radio network comprising base transceiver stations coupled via cable or radio link to base station controllers, the method comprising arranging decentrally within the cell region of each existing transceiver station a plurality of additional transceiver stations so that they surround the existing transceiver station of the respective cell region, the additional transceiver stations being coupled to the existing transceiver station; selecting the frequencies of the additional transceiver stations so that a plurality of cell areas having respectively different transmission frequencies are formed per cell region, and grouping a plurality of adjacent, decentral transceiver stations into one cell area by allocating to these the same transmission frequencies.

14. A method according to claim 13, wherein the original base transceiver stations are located in the center of each cell region, and in addition to channel units for area coverage, further channel units are provided for bidirectional data relay to at least one further base transceiver station.

15. An arrangement of base transceiver stations of an area-covering radio network having an area divided into a plurality of cell areas each having a uniform transmission frequency, wherein respectively abutting cell areas are operated at different transmission frequencies, and wherein at least the cell areas which are operated at certain transmission frequencies are each formed of a plurality of cells, whose areas are covered by a respective base transceiver station, each base transceiver station being allocated exclusively to one cell area, the arrangement comprising:

(a) a plurality of base transceiver stations coupled to a base station controller via an associated common connecting station;

(b) common channel units for all base transceiver stations of a cell area which are coupled to the same connecting station for coupling to the base station controller and disposed inside the associated connecting station;

(c) at each base transceiver station, an aerial for area coverage of its associated cell and an additional aerial with a directional characteristic oriented towards the associated connecting station; and (d) a transmitting and a receiving branch connected in antiparallel coupling both aerials of each transceiver station and comprising at least a respective frequency converter and an amplifier coupled to the output of each frequency converter.

16. An arrangement according to claim 15, wherein the base transceiver stations located at an edge of a cell area have a smaller mutual distance than base transceiver stations located in the interior of the cell area.

17. An arrangement according to claim 15, wherein base transceiver stations located at an edge of a cell area have a lower transmission power than base transceiver stations located in the interior of the cell area.

18. An arrangement according to claim 15 wherein no individual cell is allocated to the connecting stations.

19. An arrangement according to claim 15, wherein at least one running time element is available in each of the connecting stations, which is started by the transmitter of a channel unit and after the elapse of its time interval actuates a receiver of the respective channel unit.

20. An arrangement according to claim 15, wherein a time-lag device with an adjustable time constant is connected at inputs and/or outputs of the transmitting and receiving branches.

21. An arrangement according to claim 19, wherein the time interval of the running time element in the connecting station corresponds to the sum of twice the running time between the connecting station and the most remote base transceiver station, twice the signal running time through a base transceiver station with the time-lag constant (T) set at the minimum, and a fixed, predetermined reaction time.

* * * * *